United States Patent
Tonouchi

(10) Patent No.: US 9,111,227 B2
(45) Date of Patent: Aug. 18, 2015

(54) MONITORING DATA ANALYZING APPARATUS, MONITORING DATA ANALYZING METHOD, AND MONITORING DATA ANALYZING PROGRAM

(75) Inventor: Toshio Tonouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 13/824,601

(22) PCT Filed: Dec. 12, 2011

(86) PCT No.: PCT/JP2011/078710
§ 371 (c)(1),
(2), (4) Date: Mar. 18, 2013

(87) PCT Pub. No.: WO2012/086443
PCT Pub. Date: Jun. 28, 2012

(65) Prior Publication Data
US 2013/0185236 A1 Jul. 18, 2013

(30) Foreign Application Priority Data

Dec. 24, 2010 (JP) .................................. 2010-288525

(51) Int. Cl.
*G06F 15/18* (2006.01)
*G06E 1/00* (2006.01)
(Continued)

(52) U.S. Cl.
CPC .............. *G06N 3/08* (2013.01); *G06F 11/3452* (2013.01); *G06F 11/3485* (2013.01); *G06F 11/3409* (2013.01); *G06F 11/3447* (2013.01); *G06F 11/3476* (2013.01); *G06F 2201/81* (2013.01); *G06F 2201/88* (2013.01)

(58) Field of Classification Search
None
See application file for complete search history.

(56) References Cited

U.S. PATENT DOCUMENTS 7,062,760 B2 * 6/2006 Tonouchi ...................... 717/143
7,127,511 B2 * 10/2006 Tonouchi ...................... 709/225
(Continued)

FOREIGN PATENT DOCUMENTS

JP 7-65168 A 3/1995
JP 2002-268922 A 9/2002
(Continued)

OTHER PUBLICATIONS

Adaptive resolution storage system based on LOG-POLAR transform for multi-target trackers, Zhang Ye Computer Application and System Modeling (ICCASM), 2010 International Conference on vol. 9 DOI: 10.1109/ICCASM.2010.5622945 Publication Year: 2010 , pp. V9-662-V9-664.*
(Continued)

*Primary Examiner* — Michael B Holmes
(74) *Attorney, Agent, or Firm* — Sughrue Mion, PLLC

(57) ABSTRACT

An object of the present invention is to reduce a prediction error even if a monitoring target system has a plurality of patterns of use. A monitoring data analyzing apparatus includes a log data file 21 configured to accumulate log data including monitoring data in a monitoring target system set as a target of performance management, a data classifying section 11 configured to classify the log data into a plurality of groups on the basis of characteristics of use status data included in the log data and indicating statuses of use of components of the monitoring target system, and a regression-model generating section 12 configured to execute a regression analysis of the log data and generate a regression model for each of the groups.

11 Claims, 12 Drawing Sheets

(51) Int. Cl.
*G06E 3/00* (2006.01)
*G06G 7/00* (2006.01)
*G06N 3/08* (2006.01)
*G06F 11/34* (2006.01)

(56) References Cited

U.S. PATENT DOCUMENTS

| | | | |
|---|---|---|---|
| 8,484,514 B2* | 7/2013 | Tonouchi | 714/26 |
| 2007/0214261 A1 | 9/2007 | Kikuchi et al. | |
| 2009/0287744 A1 | 11/2009 | Bernardini et al. | |

FOREIGN PATENT DOCUMENTS

| | | |
|---|---|---|
| JP | 2003-263342 A | 9/2003 |
| JP | 2004-86897 A | 3/2004 |
| JP | 2011-70635 A | 4/2011 |
| WO | 2006/046297 A1 | 5/2006 |

OTHER PUBLICATIONS

Analysis farm: A cloud-based scalable aggregation and query platform for network log analysis, Jianwen Wei ; Yusu Zhao ; Kaida Jiang ; Rui Xie ; Yaohui Jin Cloud and Service Computing (CSC), 2011 International Conference on DOI: 10.1109/CSC.2011.6138547 Publication Year: 2011 , pp. 354-359.*

Preliminary design and development of industrial inspection e-monitoring system, Basari, A.S.H. ; Idris, A. ; Herman, N.S. Networking and Information Technology (ICNIT), 2010 International Conference on DOI: 10.1109/ICNIT.2010.5508527 Publication Year: 2010 , pp. 209-213.*

Separated Linux Process Logging Mechanism for Embedded Systems Amontamavut, P. ; Nakagawa, Y. ; Hayakawa, E. Embedded and Real-Time Computing Systems and Applications (RTCSA), 2012 IEEE 18th International Conference on DOI: 10.1109/RTCSA.2012. 64 Publication Year: 2012 , pp. 411-414.*

International search Report for PCT/JP2011/078710 dated Feb. 7, 2012.

* cited by examiner

Fig. 2

| LOG DATA | | | | | |
|---|---|---|---|---|---|
| TIME SEGMENT | DISK UTILIZATION RATE | NUMBER OF REQUESTS | NUMBER OF TIMES OF WRITE | NUMBER OF TIMES OF READOUT | AVERAGE DATA LENGTH |
| 1 | 0.67 | 100 | 90 | 10 | 1,017 |
| 2 | 0.34 | 126 | 25 | 101 | 994 |
| 3 | 0.26 | 75 | 15 | 60 | 1,003 |
| 4 | 0.33 | 121 | 26 | 95 | 1,004 |
| 5 | 0.30 | 109 | 20 | 89 | 1,001 |
| 6 | 0.40 | 63 | 57 | 6 | 1,010 |
| 7 | 0.30 | 100 | 19 | 81 | 1,010 |
| 8 | 0.31 | 98 | 21 | 77 | 1,024 |
| ⋮ | ⋮ | ⋮ | ⋮ | ⋮ | ⋮ |

Fig. 7

|  | NUMBER OF TIMES OF WRITE | NUMBER OF TIMES OF READOUT |
|---|---|---|
| GROUP 1 | 0.87 | 0.13 |
| GROUP 2 | 0.20 | 0.80 |

Fig. 8

| LOG DATA | | | | | |
|---|---|---|---|---|---|
| TIME SEGMENT | DISK UTILIZATION RATE | NUMBER OF REQUESTS | NUMBER OF TIMES OF WRITE | NUMBER OF TIMES OF READOUT | AVERAGE DATA LENGTH |
| 1 | 0.67 | 100 | 90 | 10 | 1,017 |

MONITORING DATA ANALYZING APPARATUS, MONITORING DATA ANALYZING METHOD, AND MONITORING DATA ANALYZING PROGRAM

CROSS REFERENCE TO RELATED APPLICATIONS

This application is a National Stage of International Application No. PCT/JP2011/078710 filed Dec. 12, 2011, claiming priority based on Japanese Patent Application No. 2010-288525 filed Dec. 24, 2010, the contents of all of which are incorporated herein by reference in their entirety.

BACKGROUND

The present invention relates to a monitoring data analyzing apparatus, a monitoring data analyzing method, and a monitoring data analyzing program.

There is a technique for, in carrying out performance management for a system, regressively analyzing monitoring data in the past in the monitoring target system to calculate a regression model and predicting a performance value of the system using the regression model. For example, Patent Document 1 described below discloses a technique concerning a performance monitoring apparatus for a WWW site.

Patent Document 1: Patent Publication JP-A-2002-268922

Some systems have a plurality of patterns of use such as, for example, being used frequently for data retrieval such as browsing processing in the daytime and used frequently for data update such as batch processing at night. In such systems, when a utilization rate of a disk with respect to the number of operation requests for readout, write, and the like is predicted, a regression model is generated using monitoring data in all the patterns of use in the conventional performance managing method. Therefore, there is a large difference between actual values in the patterns of use and prediction values by the regression model, leading to increase in prediction error.

SUMMARY

The present invention has been devised to solve the problems and an object of the present invention is to provide a monitoring data analyzing apparatus, a monitoring data analyzing method, and a monitoring data analyzing program that can reduce a prediction error even if a monitoring target system has a plurality of patterns of use.

A monitoring data analyzing apparatus according to the present invention includes: a data accumulating section configured to accumulate log data including monitoring data in a monitoring target system set as a target of performance management; a data classifying section configured to classify the log data into a plurality of groups on the basis of characteristics of use status data included in the log data and indicating statuses of use of components of the monitoring target system; and a regression-model generating section configured to execute a regression analysis of the log data and generate a regression model for each of the groups.

A monitoring data analyzing method according to the present invention includes the steps of: accumulating log data including monitoring data in a monitoring target system set as a target of performance management; classifying the log data into a plurality of groups on the basis of characteristics of use status data included in the log data and indicating statuses of use of components of the monitoring target system; and executing a regression analysis of the log data and generating a regression model for each of the groups.

A monitoring data analyzing program according to the present invention causes a computer to execute the steps included in the monitoring data analyzing method.

According to the present invention, it is possible to reduce a prediction error even if a monitoring target system has a plurality of patterns of use.

DESCRIPTION OF THE DRAWINGS

FIG. 2 is a diagram illustrating a data configuration of a log data file.

FIG. 7 is a diagram illustrating elements of a matrix A.

FIG. 8 is a diagram showing an example of test target log data.

DETAILED DESCRIPTION

Preferred embodiments of a monitoring data analyzing apparatus, a monitoring data analyzing method, and a monitoring data analyzing program according to the present invention are explained below with reference to the accompanying drawings. The monitoring data analyzing apparatus according to the present invention is an apparatus that analyzes monitoring data in a monitoring target system set as a target of performance management.

First Embodiment

First, the configuration of a monitoring data analyzing apparatus in a first embodiment is explained.

The monitoring data analyzing apparatus physically includes, for example, a CPU (Central Processing Unit), a storage device, and an input/output interface. The storage device includes components such as a ROM (Read Only Memory) and a HDD (Hard Disk Drive) that store programs and data processed by the CPU and a RAM (Random Access Memory) mainly used as various work areas for control processing. These components are connected to one another via a bus. The CPU executes the programs stored in the ROM and processes messages received via the input/output interface and data expanded in the RAM, whereby functions of sections in the monitoring data analyzing apparatus explained below can be realized.

Figure 1:
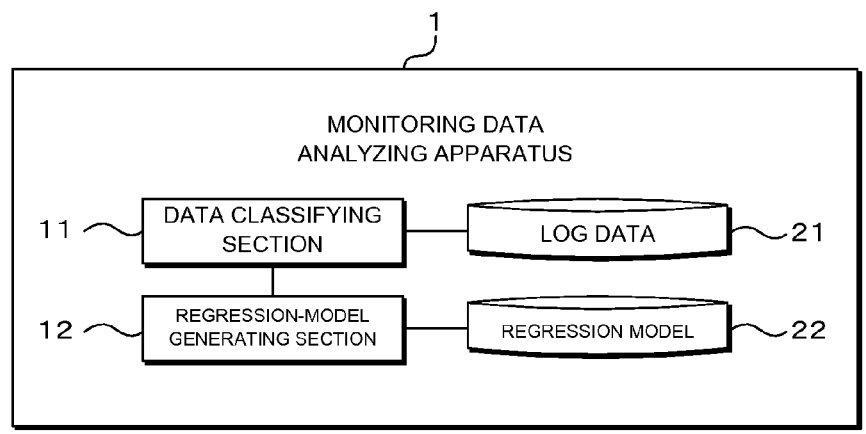
FIG. 1 is a diagram illustrating the configuration of a monitoring data analyzing apparatus in a first embodiment.

As shown in FIG. 1, a monitoring data analyzing apparatus 1 functionally includes, for example, a data classifying section 11 and a regression-model generating section 12.

The data classifying section 11 classifies log data stored in a log data file 21 into groups for each of patterns of use. For example, a data retrieval type (a readout type) and a data update type (a write type) correspond to the patters of use. The log data is data in which monitoring data in the monitoring target system is recorded in time series.

A data configuration of the log data file 21 is explained with reference to FIG. 2. The log data file 21 includes, as data items, for example, a time segment item, a disk utilization rate item, the number of requests item, the number of times of write item, the number of times of readout item, and an average data length item. In the log data file 21, one record (hereinafter referred to as "log record".) is generated for each of time segment items.

In the time segment item, segment information for identifying a period of time to which respective data of the log record belongs. In the disk utilization rate item, a utilization rate of a disk (e.g., a HDD) in the monitoring target system is stored. In this embodiment, a resource utilization rate of the monitoring target system is explained using a disk utilization rate. However, the resource utilization rate is not limited to the disk utilization rate. As the resource utilization rate, data indicating a status of use of components of the monitoring target system can be used. Specifically, besides the disk utilization rate, for example, a utilization rate of the CPU, a utilization rate of a memory (e.g., the RAM), a utilization rate of a network, and the like correspond to the resource utilization rate.

In the number of requests item, the number of requests received by the monitoring target system is stored. The number of requests item is not limited to the number of requests. For example, a ratio of arrival of requests may be used.

In the number of times of write item, the number of times data is written in the disk of the monitoring target system is stored. In the number of times of readout item, the number of times data is read out from the disk of the monitoring target system is stored. In the average data length item, an average value in a target period of time of data lengths of requests received in the target period of time is stored.

As a method of classifying log data into groups of each of patterns of use, for example, a publicly-known clustering method such as a shortest distance method, a longest distance method, a group average method, or a ward method can be used.

An example of a procedure in classifying log data into a plurality of groups using the clustering method is explained below. In this embodiment, as a characteristic in classifying log data into groups, a characteristic of a disk utilization rate $\rho$ with respect to the number of requests $\lambda$ is used.

Figure 3:
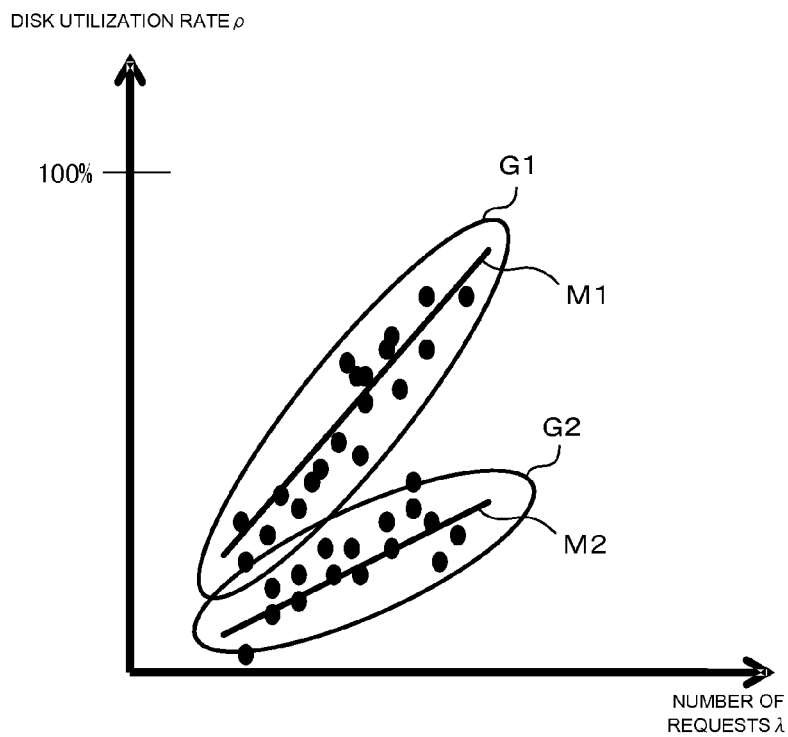
FIG. 3 is a diagram illustrating a regression model.

First, log data is arranged on a coordinate plane shown in FIG. 3 in a unit of log record. The abscissa of FIG. 3 indicates the number of requests $\lambda$ and the ordinate indicates the disk utilization rate $\rho$.

Subsequently, the data arranged on the coordinate plane is sequentially collated using the clustering method on the basis of the characteristic of the disk utilization rate $\rho$ with respect to the number of requests $\lambda$. Finally, the data is classified into a first group G1 and a second group G2 shown in FIG. 3. In this case, log data belonging to a use pattern of a data update type is classified in the first group G1. Log data belonging to a use pattern of a data retrieval type is classified in the second group G2.

The regression-model generating section 12 shown in FIG. 1 executes a regression analysis of the log data for each of the classified groups and generates a regression model. As a method of generating the regression model, for example, a method described in Reference Document 1 described below can be used.

[Reference Document 1]

Hidekazu Nagahata, "Tahenryo-Kaiseki e no Suteppu" ("Step to a Multivariate Analysis"), Chapter 2 Regression Analysis, KYORITSU SHUPPAN CO., LTD.

Specifically, the regression-model generating section 12 performs the regression analysis, for example, using the disk utilization rate $\rho$ as an objective variable of the regression analysis and using the number of requests $\lambda$ as an explanatory variable of the regression analysis. For example, when the log data shown in FIG. 3 is subjected to the regression analysis, a regression model represented by Expression (1) below is generated as a regression model M1 of the log data belonging to the first group G1. A regression model represented by Expression (2) below is generated as a regression model M2 of the log data belonging to the second group G2.

$$\text{Regression model } M1: f_1(\lambda)=\rho=0.0041\lambda+0.0951 \quad \text{Expression (1)}$$

$$\text{Regression model } M2: f_2(\lambda)=\rho=0.0019\lambda+0.1188 \quad \text{Expression (2)}$$

The regression-model generating section 12 stores the generated regression model M1 and the generated regression model M2 in a regression model file 22.

Figure 4:
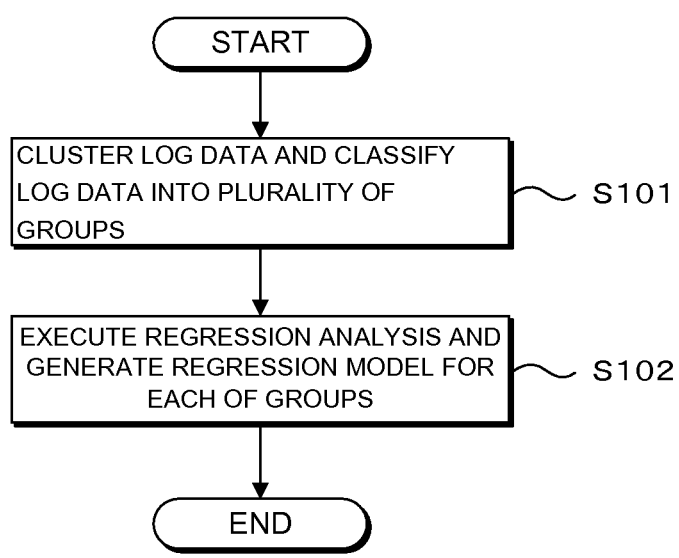
FIG. 4 is a flowchart for explaining an operation in classifying log data into a plurality of groups and generating a regression model for each of the groups in the first embodiment.

The operation of the monitoring data analyzing apparatus in the first embodiment is explained with reference to FIG. 4.

First, the data classifying section 11 clusters the log data stored in the log data file 21 and classifies the log data into a plurality of groups (step S101).

Subsequently, the regression-model generating section 12 executes a regression analysis of the log data for each of the classified groups and generates a regression model (step S102).

As explained below, the generated regression model can be used, for example, when a resource utilization rate such as a disk utilization rate is calculated and when an abnormality of the monitoring target system is determined.

As explained above, with the monitoring data analyzing apparatus 1 in the first embodiment, it is possible to classify the log data into groups corresponding to the use patterns of the data update type, the data retrieval type, and the like and generate a regression model for each of the classified groups. Consequently, even if the resource utilization rate such as the disk utilization rate is substantially different for each of the use patterns, it is possible to respectively generate regression models corresponding to the respective use patterns. Therefore, even if the monitoring target system has a plurality of use patterns, it is possible to reduce an error when carrying out prediction using the regression models.

Second Embodiment

A second embodiment of the present invention is explained. First, the configuration of a monitoring data analyzing apparatus in the second embodiment is explained.

Figure 5:
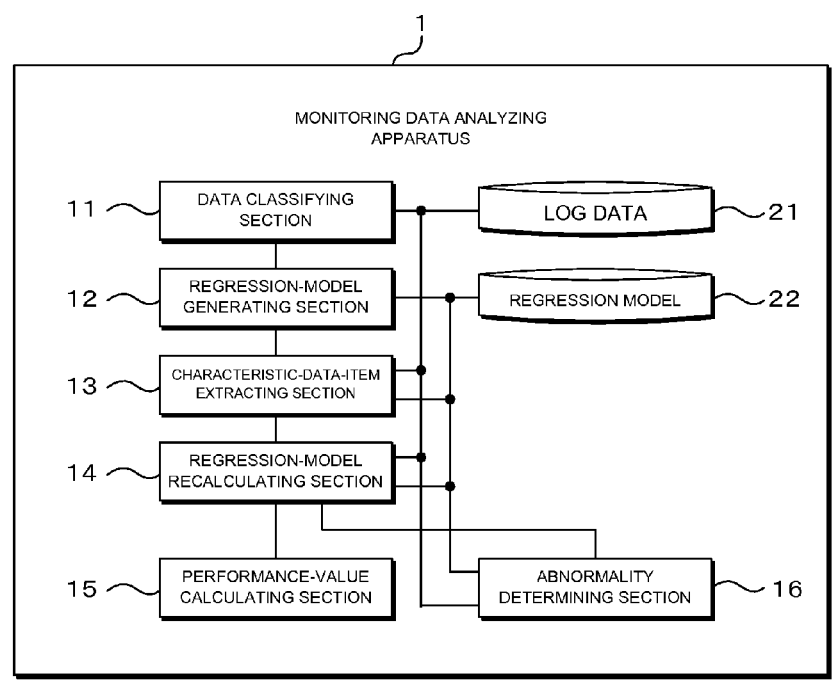
FIG. 5 is a diagram illustrating the configuration of a monitoring data analyzing apparatus in a second embodiment.

As shown in FIG. 5, the monitoring data analyzing apparatus in the second embodiment is different from the monitoring data analyzing apparatus in the first embodiment in that the monitoring data analyzing apparatus in the second embodiment further includes a characteristic-data-item extracting section 13, a regression-model recalculating section 14, a performance-value calculating section 15, and an abnormality determining section 16 in addition to the various functions of the monitoring data analyzing apparatus in the first embodiment (see FIG. 1). The other components are the same as the components of the monitoring data analyzing apparatus in the first embodiment. Therefore, the components are denoted by the same reference numerals and signs and explanation of the components is omitted. In the following explanation, differences from the first embodiment are mainly explained.

The characteristic-data-item extracting section 13 extracts, out of the data items included in the log data, data items related to the explanatory variable (the number of requests λ) of the regression model as characteristic data items.

The characteristic-data-item extracting section 13 calculates, for each of the groups classified by the data classifying section 11, concerning data items included in the log data forming the group, dependencies on the explanatory variable of the data items. The characteristic-data-item extracting section 13 extracts, as the characteristic data items, data items having the dependencies higher than a predetermined threshold.

The dependencies on the explanatory variable of the data items can be calculated, for example, as explained below.

As indicated by Expression (3) below, the characteristic-data-item extracting section 13 calculates, targeting all groups X classified by the data classifying section 11, for each of data items $a_j$ of the log data, variances $d_j$ of values obtained by dividing values $x.a_j$ of the data item $a_j$ by a value (the number of requests) $x.\lambda$ of the explanatory variable of the regression model (hereinafter referred to as "variances $d_j$ in the entire groups".).

[Math. 1]

$$d_j = V\left(\frac{x.a_j}{x.\lambda} \,\Big|\, x \in X\right) \quad \text{Expression (3)}$$

As indicated by Expression (4) below, the characteristic-data-item extracting section 13 calculates, by targeting each of groups $X_i$ classified by the data classifying section 11, for each of data items $a_j$ of the log data belonging to the groups $X_i$, variances $d_{ji}$ of values obtained by dividing the values $x.a_j$ of the data item $a_j$ by the value (the number of requests) $x.\lambda$ of the explanatory variable of the regression model.

[Math. 2]

$$d_{ji} = V\left(\frac{x.a_j}{x.\lambda} \,\Big|\, x \in X_i\right) \quad \text{Expression (4)}$$

As indicated by Expression (5) below, the characteristic-data-item extracting section 13 totalizes, in all the groups X, the variances $d_{ji}$ of the data items $a_j$ calculated for each of the groups $X_i$ to calculate a total $d_j'$ in the entire groups of the variances $d_{ji}$ in the groups $X_i$ (hereinafter referred to as "sum $d_j'$ of the variances in the groups".).

[Math. 3]

$$d_j' = \sum_i d_{ji} = \sum_i V\left(\frac{x.a_j}{x.\lambda} \,\Big|\, x \in X_i\right) \quad \text{Expression (5)}$$

When the value obtained by dividing the sum $d_j'$ of the variances in the groups by the variances $d_j$ of the entire groups is smaller than a predetermined threshold k ($d_j'/d_j<k$), the characteristic-data-item extracting section 13 determines that the data items $a_j$ satisfying the condition have high dependencies on the explanatory variable and extracts the data items $a_j$ as the characteristic data items.

Figure 6:
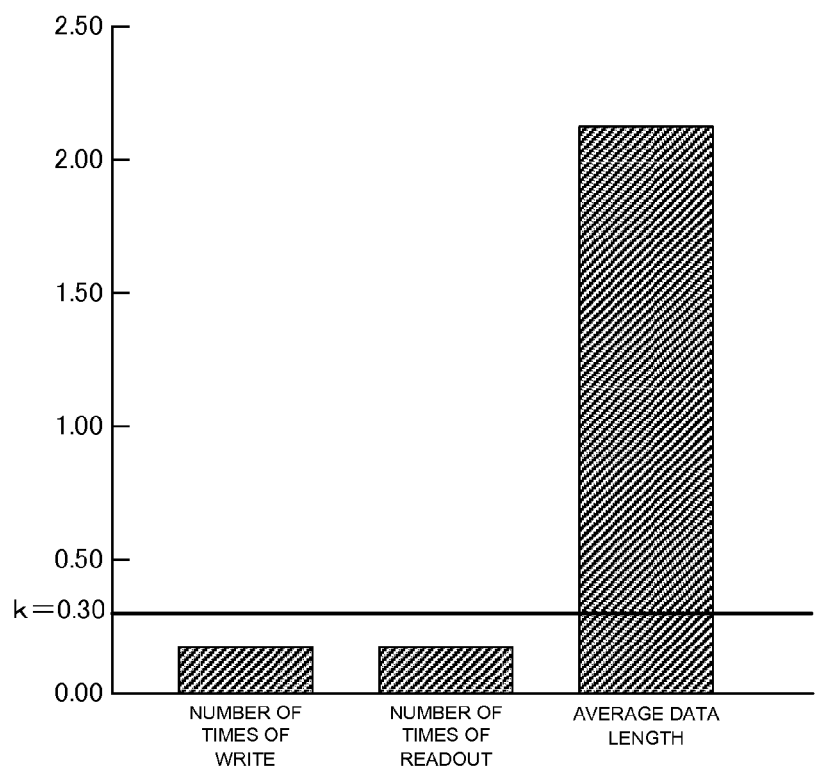
FIG. 6 is a graph illustrating characteristic data items.

In FIG. 6, a diagram representing, as a bar graph, a value of ($d_j'/d_j$) per the data item $a_j$ is shown. In FIG. 6, the data items $a_j$ are arranged on the abscissa and a value of (dj'/dj) is shown on the ordinate. The threshold k is set to 0.3. In this case, data items having values of (dj'/dj) smaller than 0.3 are "the number of times of write item" and "the number of times of readout item". Therefore, "the number of times of write item" and "the number of times of readout item" are extracted as the characteristic data items.

The regression-model recalculating section 14 shown in FIG. 5 combines a plurality of regression models generated by the regression-model generating section 12 referring to the characteristic data items extracted by the characteristic-data-item extracting section 13 to calculate (recalculate) a regression model used in performing a performance test of the monitoring target system.

When the characteristic data items are known in advance, the regression-model recalculating section 14 can use the known data items instead of referring to the characteristic data items extracted by the characteristic-data-item extracting section 13. For example, it is known that, in a Web system, processing performance is substantially different the time when write in a database is present and the time when write in the database is absent. Therefore, in such a case, it is known in advance that "the number of times of write item" and "the number of times of readout item" are the characteristic data items.

Specifically, the regression-model recalculating section 14 calculates, for each of the groups, ratios of values of the characteristic data items with respect to the explanatory variable and combines the regression models of the groups using the calculated ratios to calculate regression models per characteristic data item, which are regression models concerning the characteristic data items. The regression-model recalculating section 14 combines the calculated regression models per characteristic data item according to appearance ratios of the characteristic data items included in target log data of a performance test in the monitoring target system (hereinafter referred to as "test target log data") to calculate regression models.

The regression-model recalculating section 14 calculates the regression models per characteristic data item, for example, as explained below.

First, when the number of classified groups is represented as m and the number of extracted characteristic data items is represented as n, the regression-model recalculating section 14 generates a matrix A of m rows and n columns. In elements (i, j) of the matrix A, average values in the groups $X_i$ of values obtained by dividing values of the characteristic data items $a_j$ by the explanatory variable (the number of requests λ) are arrayed.

For example, as shown in FIG. 7, when the classified groups are two groups, i.e., "a group 1" and "a group 2" and the extracted characteristic data items are two data items, i.e., "the number of times of write item" and "the number of times of readout item", the matrix A is a matrix of 2 rows×2 columns. In data fields shown in FIG. 7, average values in the groups of values obtained by dividing values of the characteristic items by the number of requests λ are stored. That is, the values of the data fields are the elements (i, j) of the matrix A. The matrix A in this case is represented as shown below.

[Math. 4]

$$A = \begin{pmatrix} 0.87 & 0.13 \\ 0.20 & 0.80 \end{pmatrix}$$

Subsequently, the regression-model recalculating section 14 calculates a pseudo inverse matrix $A^+$ of the matrix A. As a method of calculating the pseudo inverse matrix, for example, a method described in Reference Document 2 described below can be used.

[Reference Document 2]

D. A. Harvill, "Matrix Algebra From a Statistician's Perspective: Second Volume (2)", Chapter 20 Moore-Penrose Inverse, Springer Japan KK For example, the pseudo inverse matrix $A^+$ of the matrix A illustrated above is represented as follows.

[Math. 5]
$$A^+ = \begin{pmatrix} 1.2 & -0.2 \\ -0.3 & 1.3 \end{pmatrix}$$

Subsequently, when a value of a certain characteristic data item $a_j$ is set to "1" and a value of the other characteristic data items is set to "0", the regression-model recalculating section 14 calculates regression models $h_{aj}(\lambda)$ using Expression (6) below to calculate the regression models per characteristic data item. In Expression (6), $f_i(\lambda)$ represents regression models of the groups Xi generated by the regression-model generating section 12.

[Math. 6]
$$\begin{pmatrix} \vdots \\ h_{a_j}(\lambda) \\ \vdots \end{pmatrix} = A^+ \begin{pmatrix} \vdots \\ f_i(\lambda) \\ \vdots \end{pmatrix}$$ Expression (6)

It is assumed that the regression model of "the group 1" shown in FIG. 7 is "$f_1(\lambda)=0.0041\lambda+0.0951$" and the regression model of "the group 2" shown in FIG. 7 is "$f_2(\lambda)=0.0019\lambda+0.1188$". In this case, a regression model per characteristic data item of "the number of times of write item $a_1$" is calculated as "$h_{a1}(\lambda)=1.2(0.0041\lambda+0.0951)-0.2(0.0019\lambda+0.1188)$" using Expression (6) above. A regression model per characteristic data item of "the number of times of write item $a_2$" is calculated as "$h_{a2}(\lambda)=-0.3(0.0041\lambda+0.0951)+1.3(0.0019\lambda+0.1188)$" using Expression (6) above.

A procedure in recalculating regression models using the regression models per characteristic data item is explained below.

First, the regression-model recalculating section 14 calculates average values $b_j$ in the test target log data of values obtained by dividing values of the characteristic data items $a_j$ included in the test target log data by the explanatory variable (the number of requests $\lambda$).

Subsequently, the regression-model recalculating section 14 generates a regression model $f(\lambda)$ using Expression (7) below. That is, the regression-model recalculating section 14 recalculates, using a plurality of existing regression models, regression models used in performing a performance test on the basis of the test target log data.

[Math. 7]
$$f(\lambda) = (\cdots \ b_j \ \cdots) \begin{pmatrix} \vdots \\ h_{a_j}(\lambda) \\ \vdots \end{pmatrix}$$ Expression (7)

It is assumed that the test target log data is log data shown in FIG. 8. In this case, an average value $b_1$ of values obtained by dividing values of "the number of times of write item $a_1$", which is the characteristic data item, by the number of requests $\lambda$ is 90/100=0.9. An average value $b_2$ of values obtained by dividing values of "the number of times of readout item $a_2$" by the number of requests $\lambda$ is 10/100=0.1.

Therefore, a regression model used in performing the performance test on the basis of the test target log data shown in FIG. 8 is calculated as "$f(\lambda)=0.9h_{a1}(\lambda)+0.1h_{a2}(\lambda)$" from Expression (7) above.

The performance-value calculating section 15 shown in FIG. 5 calculates the disk utilization rate $\rho$ corresponding to the number of requests $\lambda$ using the regression model $f(\lambda)$ recalculated by the regression-model recalculating section 14. Consequently, it is possible to calculate a performance value based on the test target log data.

For example, when the recalculated regression model is "$f(\lambda)=0.9h_{a1}(X)+0.1h_{a2}(\lambda)$", the regression model per characteristic item of the number of times of write item $a_1$" is "$h_{a1}(\lambda)=1.2(0.0041\lambda+0.0951)-0.2(0.0019\lambda+0.1188)$", and the regression model per characteristic data item of the number of times of readout item $a_2$ is "$h_{a2}(\lambda)=-0.3(0.0041\lambda+0.0951)+1.3(0.0019\lambda+0.1188)$", the disk utilization rate $\rho$ at the time when the assumed number of requests $\lambda$ is set to "400" is calculated.

In this case, the disk utilization rate $\rho$ is calculated as $\rho=f(400)=0.9h_{a1}(400)+0.1h_{a2}(400)=1.77$. That is, in this example, the disk utilization rate $\rho$ exceeds 1. Therefore, in this case, an administrator takes measures for, for example, reinforcing disk resources.

The abnormality determining section 16 shown in FIG. 5 determines, for each of log records of the test target log data, whether a difference ($|f(\lambda')-\rho'|$) between a value $f(\lambda')$ obtained by substituting a value $\lambda'$ of the number of requests item in the regression model $f(\lambda)$ and a value $\rho'$ of the disk utilization rate item is larger than a predetermined threshold. When ($|f(\lambda')-\rho'|$) is larger than the predetermined threshold, the abnormality determining section 16 determines that an abnormality occurs in the monitoring target system.

Specifically, presence or absence of an abnormality in the monitoring target system can be determined as explained below.

Concerning an objective variable (the disk utilization rate $\rho$) of the regression model $f(\lambda)$ recalculated by the regression-model recalculating section 14, the abnormality determining section 16 calculates variance $V(\rho)$ and calculates a standard deviation ($\sqrt{V}$) of the variance. The abnormality determining section 16 calculates $|f(\lambda')-\rho'|$ and, when a value obtained by dividing this value by the standard deviation ($\sqrt{V}$) is larger than a threshold a, determines that an abnormality occurs in the monitoring target system. A value of the threshold a can be arbitrarily set. In other words, the abnormality determining section 16 determines presence or absence of an abnormality on the basis of a degree of a difference of the value of $|f(X')-\rho'|$ from the standard deviation ($\sqrt{V}$).

The variance $V(\rho)$ can be obtained by, for example, calculating Expression (9) below derived from Expression (8) below. The regression model $f(\lambda)$ of Expression (8) below can be derived from Expression (6) and Expression (7) above. The variance $V(\rho)$ of Expression (9) below can be derived from Expression (8) below.

[Math. 8]
$$f(\lambda) = (\cdots \ b_j \ \cdots) A^+ \begin{pmatrix} \vdots \\ f_i(\lambda) \\ \vdots \end{pmatrix} = \sum_j e_j f_i(\lambda)$$ Expression (8)

-continued $$V(\rho) = \sum_j e_j^2 V(\rho_j) \qquad \text{Expression (9)}$$

$V(\rho_j)$ of Expression (9) above represents variances concerning the objective variable (the disk utilization rate ρ) of the regression model calculated for each of the groups $X_i$. $\rho_j$ represents probability variables indicating distributions of the objective variable in the groups $X_i$.

The operation of the monitoring data analyzing apparatus in the second embodiment is explained. An operation in classifying log data into a plurality of groups and generating a regression model for each of the groups is the same as the operation of the monitoring data analyzing apparatus in the first embodiment (see FIG. 4). Therefore, explanation of the operation is omitted.

Figure 9:
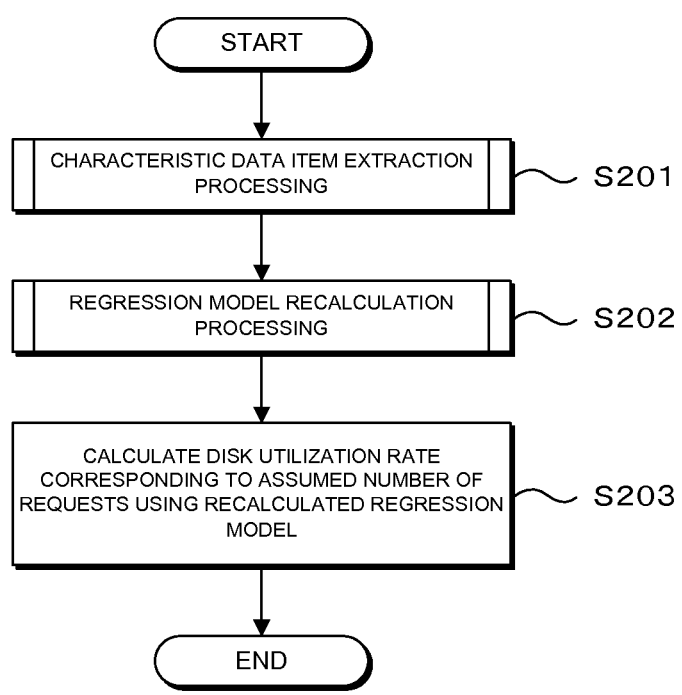
FIG. 9 is a flowchart for explaining an operation in calculating a disk utilization rate using a regression model in the second embodiment.

First, an operation in calculating a disk utilization rate using regression models is explained with reference to FIG. 9.

First, the characteristic-data-item extracting section 13 executes characteristic data item extraction processing explained below (step S201). Subsequently, the regression-model recalculating section 14 executes regression model recalculation processing explained later (step S202). Subsequently, the performance-value calculating section 15 calculates a disk utilization rate corresponding to an assumed number of requests using the regression model f(λ) recalculated by the regression-model recalculating section 14 (step S203). The administrator can arbitrarily set the assumed number of requests in the monitoring data analyzing apparatus.

Figure 10:
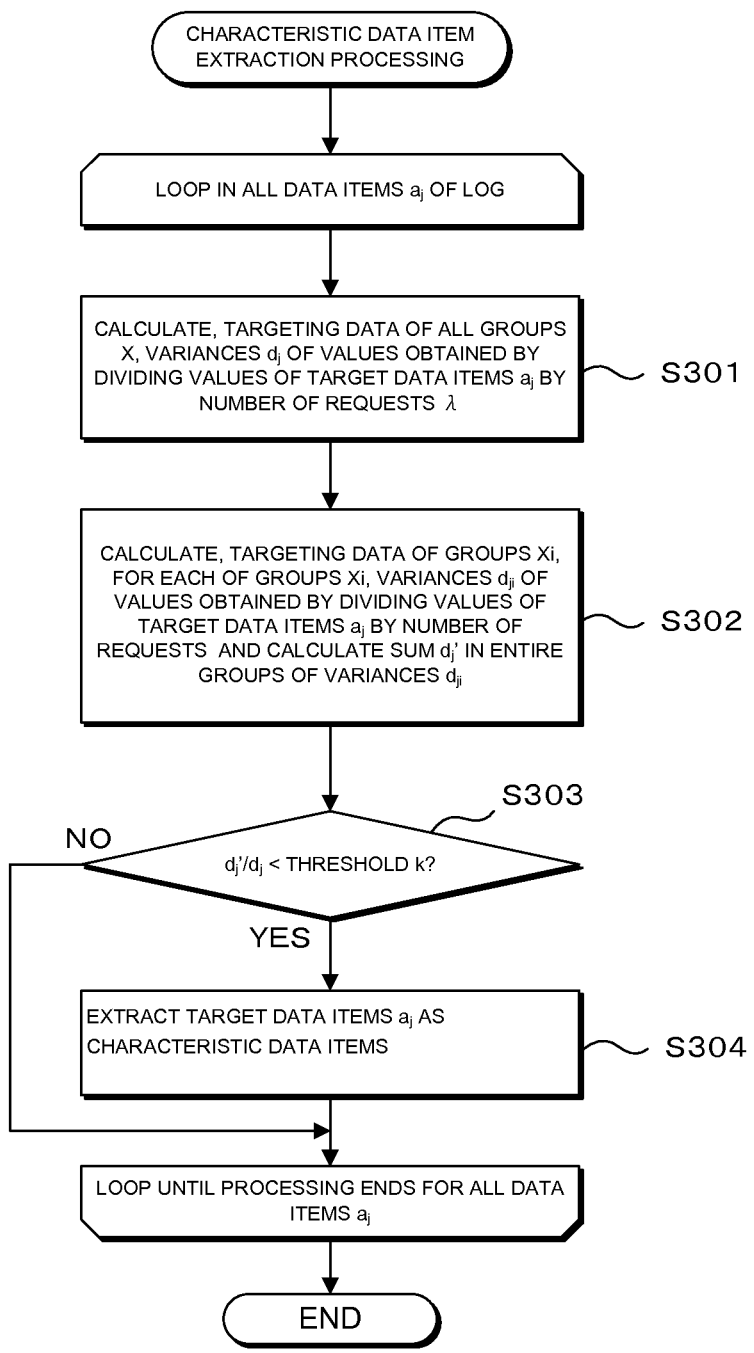
FIG. 10 is a flowchart for explaining a procedure of characteristic data item extraction processing shown in FIG. 9.

The characteristic data item extraction processing executed in step S201 is explained with reference to FIG. 10.

Processing from steps S301 to S304 explained below is executed on all the data items $a_j$ included in the log data while being sequentially looped for each of the data items $a_j$.

First, the characteristic-data-item extracting section 13 calculates, using Expression (3) above, targeting the log data of all the groups X classified by the data classifying section 11, the variances $d_j$ of values obtained by dividing values of the target data items $a_j$ by the number of requests λ (step S301).

Subsequently, the characteristic-data-item extracting section 13 calculates, using Expression (4) above, targeting the log data of the groups $X_i$, for each of the groups $X_i$, the variances $d_{ji}$ of values obtained by dividing the values of the target data items $a_j$ by the number of requests λ. The characteristic-data-item extracting section 13 further calculates the sum $d_j'$ in the entire groups of the variances $d_{ji}$ using Expression (5) above (step S302).

Subsequently, the characteristic-data-item extracting section 13 determines whether a value obtained by dividing the sum $d_j'$ calculated in step S302 by the variances $d_j$ calculated in step S301 is smaller than the threshold k (step S303). When it is determined that the value is not smaller than the threshold k (NO in step S303), the characteristic-data-item extracting section 13 shifts the processing to the subsequent stage of step S304.

On the other hand, when it is determined in step S303 that the value of $(d_j'/d_j)$ is smaller than the threshold k (YES in step S303), the characteristic-data-item extracting section 13 extracts the target data items $a_j$ as the characteristic data items (step S304).

Figure 11:
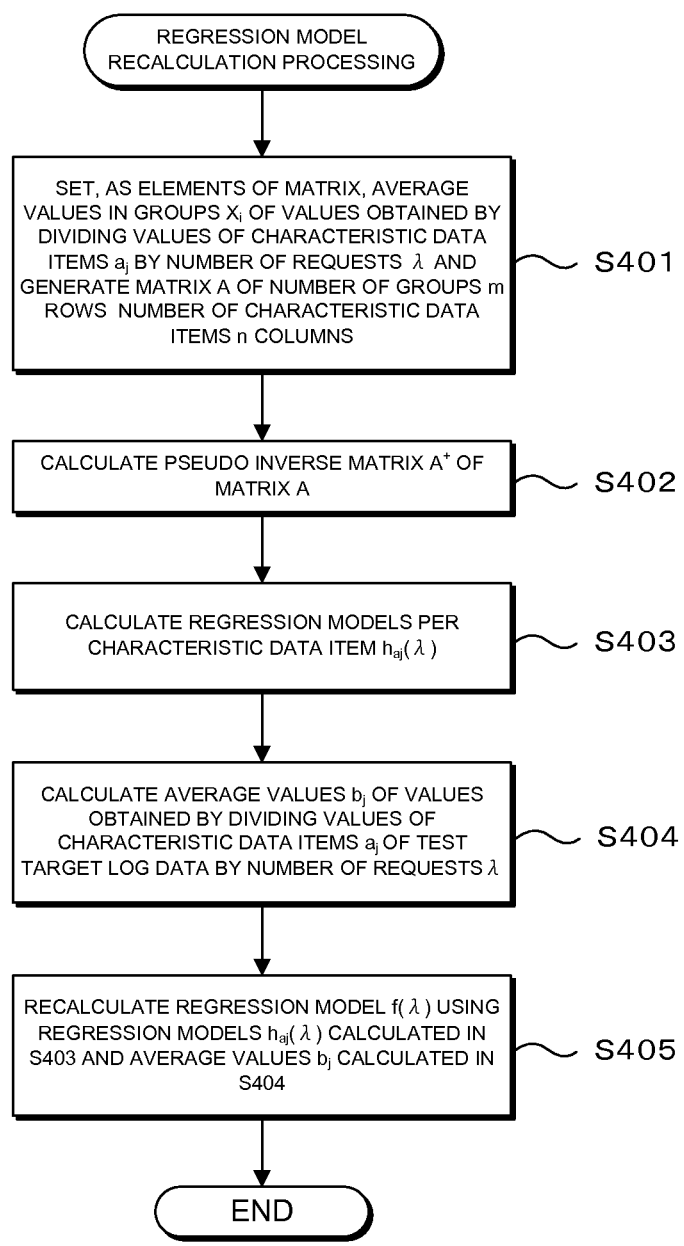
FIG. 11 is a flowchart for explaining a procedure of regression model recalculation processing shown in FIG. 9.

The regression model recalculation processing executed in step S202 is explained with reference to FIG. 11.

First, the regression-model recalculating section 14 sets, as elements of a matrix, average values in the groups $X_i$ of values obtained by dividing values of the characteristic data items $a_j$ extracted in step S201 by the explanatory variable (the number of requests λ) and generates the matrix A of the number of groups m rows× the number of characteristic data items n columns (step S401).

Subsequently, the regression-model recalculating section 14 calculates the pseudo inverse matrix $A^+$ of the matrix A (step S402).

Subsequently, the regression-model recalculating section 14 calculates the regression models per characteristic data item $h_{aj}(X)$ using Expression (6) above (step S403).

Subsequently, the regression-model recalculating section 14 calculates average values $b_j$ in the test target log data of values obtained by dividing values of the characteristic data items $a_j$ included in the test target log data by the number of requests λ (step S404).

Subsequently, the regression-model recalculating section 14 substitutes the regression models per characteristic data item $h_{aj}(\lambda)$ calculated in step S403 and the average values $b_j$ calculated in step S404 in Expression (7) above and calculates the regression model f(λ) to generate (recalculate) the regression model f(λ) for the test target log data (step S405).

Figure 12:
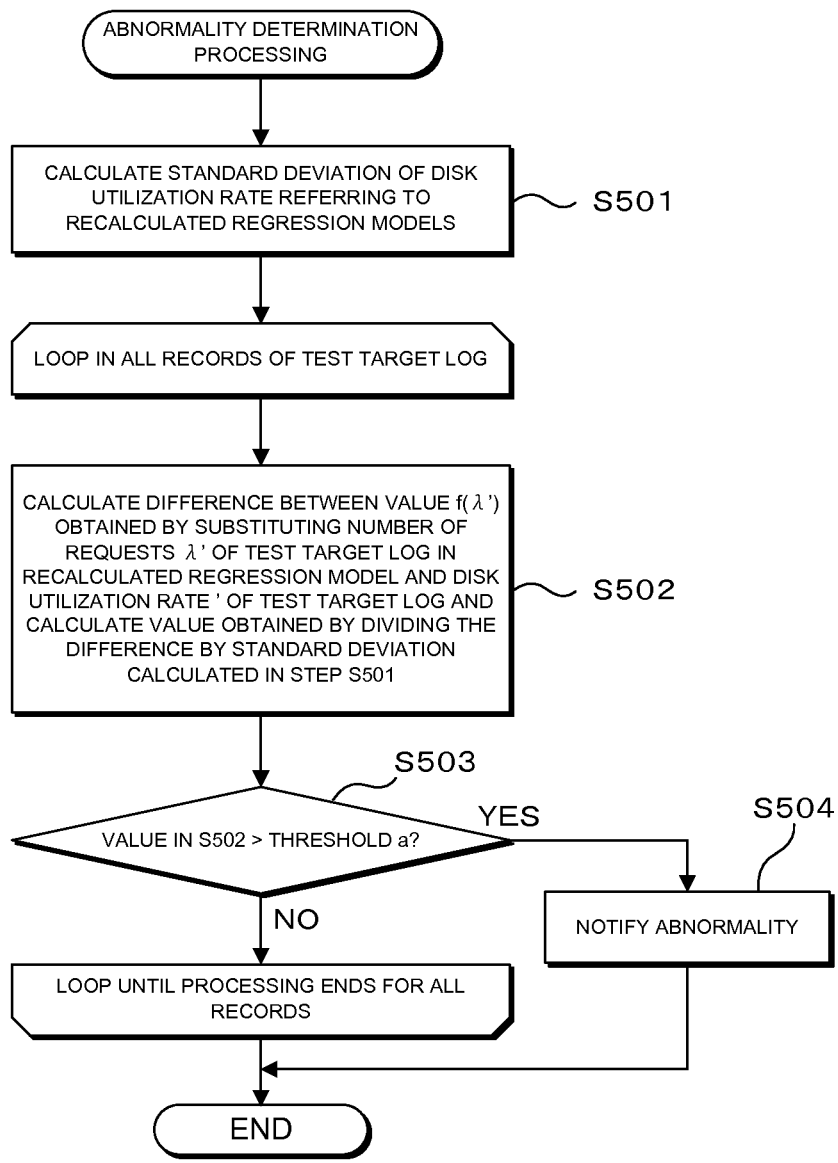
FIG. 12 is a flowchart for explaining a procedure of abnormality determination processing for a monitoring target system in the second embodiment.

Abnormality determination processing for the monitoring target system is explained with reference to FIG. 12. The abnormality determination processing is executed after step S202 in FIG. 9 explained above is executed. The abnormality determination processing may be executed in parallel to step S203 in FIG. 9 or may be executed before or after step S203.

First, the abnormality determining section 16 calculates the standard deviation ($\sqrt{V}$) concerning the objective variable (the disk utilization rate ρ) referring to the recalculated regression model f(λ) recalculated by the regression-model recalculating section 14 (step S501).

Processing from steps S502 and S503 explained below is executed targeting all the log records included in the test target log data while being sequentially looped for each of the log records.

Subsequently, the abnormality determining section 16 calculates a difference between a value f(λ') obtained by substituting the value λ' of the number of requests item of the test target log data in the recalculated regression model f(λ) and a value ρ' of the disk utilization rate item of the test target log data and calculates a value obtained by dividing the difference by the standard deviation ($\sqrt{V}$) calculated in step S501 (step S502).

Subsequently, the abnormality determining section 16 determines whether the value calculated in step S502 is larger than the threshold a (step S503). When it is determined that the value is not larger than the threshold a (NO in step S503), the abnormality determining section 16 shifts the processing to the subsequent stage.

On the other hand, when it is determined in step S503 that the value calculated in step S502 is larger than the threshold a (YES in step S503), the abnormality determining section 16 determines that an abnormality occurs in the monitoring target system and notifies the administrator of the abnormality (step S504). For example, a method of outputting a message indicating the abnormality, a method of outputting warning sound, and the like correspond to a method of notifying the administrator of the abnormality.

As explained above, according to the monitoring data analyzing apparatus in the second embodiment, in addition to the effects by the monitoring data analyzing apparatus in the first embodiment, it is possible to combine a plurality of existing regression models and generate (recalculate) a new regression model according to ratios of values of characteristic data items included in the test target log data. Consequently, it is possible to generate a regression model adapted to an assumed pattern of use and predict a resource utilization rate such as a disk utilization rate using the regression model. Therefore, even if the resource utilization rate such as the disk utilization rate is substantially different for each of use patterns, it is possible to improve prediction accuracy of the resource utilization rate and take appropriate measures according to the resource utilization rate.

Further, it is possible to find an abnormality of the monitoring target system on the basis of a difference between a regression model and the regression model adapted to the assumed pattern of use. Therefore, it is possible to improve accuracy in finding an abnormality.

The characteristic-data-item extracting section 13 in the second embodiment extracts the characteristic data items using the dependencies on the explanatory variable of the data items. However, a method of extracting the characteristic data items is not limited to this. For example, an extracting method explained below can be used.

The characteristic-data-item extracting section 13 calculates, for each of the groups $X_i$ classified by the data classifying section 11, concerning the data items $a_j$ included in the log data forming the group, average values in the groups $X_i$ of correlation coefficients between the data items $a_j$ and the explanatory variable (the number of requests $\lambda$). The characteristic-data-item extracting section 13 extracts, as the characteristic data items, the data items $a_j$ having the average values equal to or larger than a predetermined threshold k'.

The average values of the correlation coefficients between the data items $a_j$ and the explanatory variable can be calculated by, for example, a procedure explained below.

First, the characteristic-data-item extracting section 13 calculates, using Expression (10) below, for each of the groups $X_i$, correlation coefficients $r_{ji}$ between the data items $a_j$ and the explanatory variable (the number of requests $\lambda$).

[Math. 9]

$$r_{ji} = \frac{\sum_k (p^{(k)}.a_j - \overline{p.a_j})(p^{(k)}.\lambda - \overline{p.\lambda})}{\sqrt{\sum_k (p^{(k)}.a_j - \overline{p.a_j})^2 \sum_k (p^{(k)}.\lambda - \overline{p.\lambda})^2}}$$ Expression (10)

$$\overline{p.a_j} = \frac{1}{m}\sum_k p^{(k)}.a_j$$

$$\overline{p.\lambda} = \frac{1}{m}\sum_k p^{(k)}.\lambda$$

In Expression (10), $p^{(k)}.a_j$ represents values of the data items $a_j$ of kth log data belonging to the groups $X_i$, $p^{(k)}.\lambda$ represents values of the number of requests item of a kth log record belonging to the groups $X_i$, and m represents the number of groups.

Subsequently, the characteristic-data-item extracting section 13 calculates average values $r_j$ of the correlation coefficients between the data items $a_j$ and the explanatory variable by dividing a value obtained by totalizing the correlation coefficients $r_{ji}$ for each of the groups $X_i$ in all the groups X by the number of groups m. Subsequently, the characteristic-data-item extracting section 13 extracts the data items $a_j$ having $|r_j|$ equal to or larger than the threshold k' as the characteristic data items.

In the second embodiment, the characteristic data items are extracted by the characteristic-data-item extracting section 13. However, a method of obtaining the characteristic data items is not limited to this. For example, when the characteristic data items are evident, the administrator may set the characteristic data items by, for example, registering the characteristic data items in a memory. In this case, the characteristic-data-item extracting section 13 can be made unnecessary. When the characteristic-data-item extracting section 13 is made unnecessary, the regression-model recalculating section 14 only has to acquire values of the characteristic data items referring to the memory.

The regression-model recalculating section 14 in the second embodiment combines a plurality of regression models generated by the regression-model generating section 12 referring to the characteristic items to calculate (recalculate) a regression model used during performance value calculation and during abnormality determination for the monitoring target system. However, in the following cases, the regression-model recalculating section 14 can be made unnecessary. That is, test target log data used during the performance value calculation and during the abnormality determination coincides with or approximates to any one of the plurality of regression models generated by the regression-model generating section 12. For example, a certain business travel expenses settlement system interactively receives business expenses settlement from users in the daytime. On the other hand, the business travel expenses settlement system performs settlement processing through batch processing at night. In such a case, separate regression models are generated in the daytime and at night. Therefore, any one of the regression models only has to be used according to generation time of the test target log data used during the performance value calculation and during the abnormality determination.

Modifications of Embodiments

The embodiments are merely illustrations and do not exclude application of various modifications and techniques not clearly described in the embodiments. That is, the present invention can be modified and carried out in various forms without departing from the spirit of the present invention.

For example, in the embodiments, the present invention is carried out by one monitoring data analyzing apparatus. However, the present invention can be carried out by a plurality of apparatuses. In this case, the functions of the monitoring data analyzing apparatus in the embodiments only have to be distributed to the plurality of apparatuses to cause groups of the plurality of apparatuses to function in the same manner as the monitoring data analyzing apparatus in the embodiments.

A part or all of the embodiments can be described as indicated by notes below. However, the present invention is not limited to the below description.

(Note 1) A monitoring data analyzing apparatus comprising: a data accumulating section configured to accumulate log data including monitoring data in a monitoring target system set as a target of performance management; a data classifying section configured to classify the log data into a plurality of groups on the basis of characteristics of use status data included in the log data and indicating statuses of use of components of the monitoring target system; and a regression-model generating section configured to execute a regression analysis of the log data and generate a regression model for each of the groups.

(Note 2) The monitoring data analyzing apparatus according to note 1, further comprising a characteristic-data-item extracting section configured to extract, out of data items included in the log data, the data items related to an explanatory variable of the regression model as characteristic data items.

(Note 3) The monitoring data analyzing apparatus according to note 2, wherein the characteristic-data extracting section calculates, for each of the groups, dependencies on the explanatory variable in the data items of the data forming the group, and extracts data items having the calculated dependencies higher than a predetermined threshold as the characteristic data items.

(Note 4) The monitoring data analyzing apparatus according to note 2, wherein the characteristic-data extracting section calculates, for each of the groups, correlation coefficients between the data items of the data forming the group and the explanatory variable, and extracts data items having average values of the calculated correlation coefficients larger than a predetermined threshold as the characteristic data items.

(Note 5) The monitoring data analyzing apparatus according to any one of notes 1 to 4, further comprising a performance-value calculating section configured to calculate, using the regression model generated by the regression-model generating section, a performance value, which is an objective variable of the regression model.

(Note 6) The monitoring data analyzing apparatus according to any one of notes 1 to 4, further comprising an abnormality determining section configured to determine presence or absence of an abnormality in the monitoring target system on the basis of a difference between a value obtained by substituting a value of a data item corresponding to an explanatory variable of the regression model included in a test target log data, which is the log data set as a target of the performance test, in the regression model generated by the regression-model generating section, and a value of a data item corresponding to an objective variable of the regression model included in the test target log data.

(Note 7) The monitoring data analyzing apparatus according to any one of notes 2 to 4, further comprising a regression-model recalculating section configured to calculate, for each of the groups, ratios of values of the characteristic data items with respect to the explanatory variable and combine the regression models of the groups using the calculated ratios to calculate regression models per characteristic data item, which are the regression models concerning the characteristic data items, and combine the calculated regression models per characteristic data item according to appearance ratios of values of the characteristic data items included in the test target log data, which is the log data set as a target of the performance test, to recalculate the regression models.

(Note 8) The monitoring data analyzing apparatus according to note 7, further comprising a performance-value calculating section configured to calculate a performance value, which is an objective variable of the regression model, by using the regression model recalculated by the regression-model recalculating section.

(Note 9) The monitoring data analyzing apparatus according to note 7, further comprising an abnormality determining section configured to determine presence or absence of an abnormality in the monitoring target system on the basis of a difference between a value obtained by substituting a value of a data item corresponding to an explanatory variable of the regression model included in the test target log data in the regression model recalculated by the regression-model recalculating section, and a value of a data item corresponding to an objective variable of the regression model included in the test target log data.

(Note 10) A monitoring data analyzing method comprising the steps of: accumulating log data including monitoring data in a monitoring target system set as a target of performance management; classifying the log data into a plurality of groups on the basis of characteristics of use status data included in the log data and indicating statuses of use of components of the monitoring target system; and executing a regression analysis of the log data and generating a regression model for each of the groups.

(Note 11) A monitoring data analyzing program for causing a computer to execute the steps described in note 10.

This application claims priority based on Japanese Patent Application No. 2010-288525 filed on Dec. 24, 2010, the entire disclosure of which is incorporated herein.

The monitoring data analyzing apparatus, the monitoring data analyzing method, and the monitoring data analyzing program according to the present invention is suitable for reducing a prediction error even if a monitoring target system has a plurality of patterns of use.

1: monitoring data analyzing apparatus, 11: data classifying section, 12: regression-model generating section, 13: characteristic-data-item extracting section, 14: regression-model recalculating section, 15: performance-value calculating section, 16: abnormality determining section, 21: log data file, 22: regression model file

I claim:

1. A monitoring data analyzing apparatus comprising:
   a data accumulating section configured to accumulate log data including monitoring data in a monitoring target system set as a target of performance management;
   a data classifying section configured to classify the log data into a plurality of groups on the basis of characteristics of use status data included in the log data and indicating statuses of use of components of the monitoring target system; and
   a regression-model generating section configured to execute a regression analysis of the log data and generate a regression model for each of the groups.

2. The monitoring data analyzing apparatus according to claim 1, further comprising a characteristic-data-item extracting section configured to extract, out of data items included in the log data, the data items related to an explanatory variable of the regression model as characteristic data items.

3. The monitoring data analyzing apparatus according to claim 2, wherein the characteristic-data extracting section calculates, for each of the groups, dependencies on the explanatory variable in the data items of the data forming the group, and extracts data items having the calculated dependencies higher than a predetermined threshold as the characteristic data items.

4. The monitoring data analyzing apparatus according to claim 2, wherein the characteristic-data extracting section calculates, for each of the groups, correlation coefficients between the data items of the data forming the group and the explanatory variable, and extracts data items having average values of the calculated correlation coefficients larger than a predetermined threshold as the characteristic data items.

5. The monitoring data analyzing apparatus according to claim 1, further comprising a performance-value calculating section configured to calculate, using the regression model generated by the regression-model generating section, a performance value, which is an objective variable of the regression model.

6. The monitoring data analyzing apparatus according to claim 1, further comprising an abnormality determining section configured to determine presence or absence of an abnormality in the monitoring target system on the basis of a difference between a value obtained by substituting a value of a data item corresponding to an explanatory variable of the regression model included in a test target log data, which is the log data set as a target of the performance test, in the regression model generated by the regression-model generating section, and a value of a data item corresponding to an objective variable of the regression model included in the test target log data.

7. The monitoring data analyzing apparatus according to claim 2, further comprising a regression-model recalculating section configured to calculate, for each of the groups, ratios of values of the characteristic data items with respect to the explanatory variable and combine the regression models of the groups using the calculated ratios to calculate regression models per characteristic data item, which are the regression models concerning the characteristic data items, and combine the calculated regression models per characteristic data item according to appearance ratios of values of the characteristic data items included in the test target log data, which is the log data set as a target of the performance test, to recalculate the regression models.

8. The monitoring data analyzing apparatus according to claim 7, further comprising a performance-value calculating section configured to calculate a performance value, which is an objective variable of the regression model, by using the regression model recalculated by the regression-model recalculating section.

9. The monitoring data analyzing apparatus according to claim 7, further comprising an abnormality determining section configured to determine presence or absence of an abnormality in the monitoring target system on the basis of a difference between a value obtained by substituting a value of a data item corresponding to an explanatory variable of the regression model included in the test target log data in the regression model recalculated by the regression-model recalculating section, and a value of a data item corresponding to an objective variable of the regression model included in the test target log data.

10. A monitoring data analyzing method comprising the steps of:
   accumulating log data including monitoring data in a monitoring target system set as a target of performance management;
   classifying the log data into a plurality of groups on the basis of characteristics of use status data included in the log data and indicating statuses of use of components of the monitoring target system; and
   executing a regression analysis of the log data and generating a regression model for each of the groups.

11. A monitoring data analyzing program for causing a computer to execute the steps described in claim 10.

* * * * *

UNITED STATES PATENT AND TRADEMARK OFFICE
CERTIFICATE OF CORRECTION

PATENT NO.        : 9,111,227 B2                                    Page 1 of 1
APPLICATION NO.   : 13/824601
DATED             : August 18, 2015
INVENTOR(S)       : Toshio Tonouchi It is certified that error appears in the above-identified patent and that said Letters Patent is hereby corrected as shown below:

In the Specification

Column 8, Line 16: Delete ""$f(\lambda)=0.9h_{a1}(X)+0.1h_{a2}(\lambda)$",'' and insert -- $f(\lambda)=0.9h_{a1}(\lambda)+0.1h_{a2}(\lambda)$", --

Column 8, Line 52: Delete "□$f(X')$-" and insert -- □$f(\lambda')$- --

Column 10, Line 10: Delete "$h_{aj}(X)$" and insert -- $h_{aj}(\lambda)$ --

Signed and Sealed this
Fifteenth Day of March, 2016

Michelle K. Lee
*Director of the United States Patent and Trademark Office*